United States Patent
Nguyen et al.

(10) Patent No.: US 9,392,640 B2
(45) Date of Patent: Jul. 12, 2016

(54) METHOD AND SYSTEM FOR AUTOMATICALLY CONTROLLING THE INSERTION OF CONTROL WORD IN CPRI DAISY CHAIN CONFIGURATION

(71) Applicant: Freescale Semiconductor, Inc., Austin, TX (US)

(72) Inventors: Tuongvu V. Nguyen, Austin, TX (US); John J. Vaglica, Austin, TX (US); Roy Shor, Tel Aviv (IL); Somvir Dahiya, Noida (IN); Ori Goren, Kibutz Ruchama (IL); Avraham Horn, Givat Shmuel (IL); Arvind Kaushik, Ghaziabad (IN); Arindam Sinha, Noida (IN); Puneet Wadhawan, Bangalore (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 174 days.

(21) Appl. No.: 13/632,549

(22) Filed: Oct. 1, 2012

(65) Prior Publication Data
US 2014/0094157 A1    Apr. 3, 2014

(51) Int. Cl.
*H04M 1/00* (2006.01)
*H04W 88/08* (2009.01)

(52) U.S. Cl.
CPC .................................. *H04W 88/085* (2013.01)

(58) Field of Classification Search
CPC ... H04W 88/08; H04W 88/085; H04W 92/12; H04W 92/20

USPC .................................. 455/524, 525, 560, 561
See application file for complete search history.

(56) References Cited

U.S. PATENT DOCUMENTS

| | | | |
|---|---|---|---|
| 6,487,210 B1 * | 11/2002 | Janoska et al. | 370/412 |
| 7,680,095 B2 | 3/2010 | Kawai | |
| 8,321,761 B1 * | 11/2012 | Gruner et al. | 714/764 |
| 2008/0089689 A1 | 4/2008 | Sakama | |
| 2010/0296479 A1 * | 11/2010 | Cho | H04L 5/14 370/330 |
| 2012/0052878 A1 | 3/2012 | Sakama | |
| 2012/0057572 A1 | 3/2012 | Evans et al. | |

OTHER PUBLICATIONS

China Mobile Research Institute, C-RAN The Road Towards Green RAN, White Paper, version 2.5 Oct. 2011.
M. Bengtsson et al, Celtic Telecommunication Solutions, D1.4 Initial Report on Advanced Multiple Antenna Systems, Wireless World Initiative New Radio, v. 1.0, Jan. 16, 2009.

* cited by examiner

*Primary Examiner* — Thai Vu

(57) ABSTRACT

A method and apparatus automatically controls the insertion of information flow data over a shared CPRI link (561) by providing a hardware control mechanism (504-509) at a local radio base station subsystem (501) connected in a CPRI daisy chain configuration between a downstream RE device (570) and an upstream REC device (560) for determining whether the control word being transmitted is sourced from a downstream device (e.g., forwarded data from a downstream RE device) or from the local device.

20 Claims, 6 Drawing Sheets

METHOD AND SYSTEM FOR AUTOMATICALLY CONTROLLING THE INSERTION OF CONTROL WORD IN CPRI DAISY CHAIN CONFIGURATION

BACKGROUND OF THE INVENTION

1. Field of the Invention

The present invention is directed in general to field of information processing. In one aspect, the present invention relates to the transfer of information over a common interface between base station radio equipment and/or control devices.

2. Description of the Related Art

In wireless communication systems, base station systems are used to facilitate wireless communication between user equipment (UE) and a network. Typically, a base station system includes at least one radio equipment device (RE) and at least one radio equipment control device (REC) which are configured to exchange signals through a physical circuit or interface, such as a common public radio interface (CPRI) interface over which different information flows (User Plane data, Control & Management (C&M) Plane data, and Synchronization Plane data) are multiplexed. While CPRI links may be used to connect RE device(s) and REC device(s) in a variety of network topologies (e.g., chain, tree, and ring topologies), there are challenges presented with conveying an information flow over a CPRI link that is shared by more than one RE device and/or REC device. For example, in a daisy chain configuration of a REC device and two or more RE devices, an RE device that receives monitoring and control information from a downstream RE device must control the insertion of its own monitoring and control information over the shared CPRI link so as to ensure the proper communication of monitoring and control information to the upstream REC device.

BRIEF DESCRIPTION OF THE DRAWINGS

The present invention may be understood, and its numerous objects, features and advantages obtained, when the following detailed description of a preferred embodiment is considered in conjunction with the following drawings, in which.

DETAILED DESCRIPTION

Figure 1:
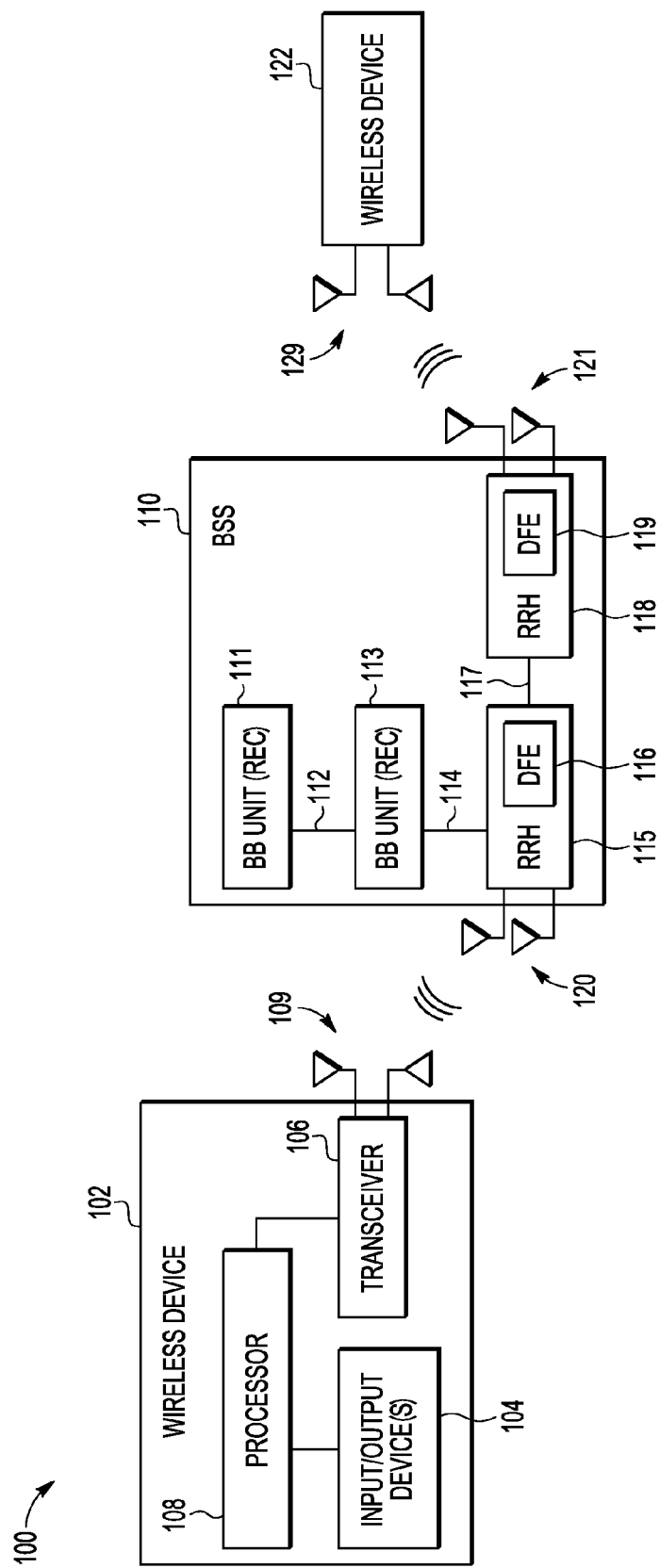
FIG. 1 is a simplified block diagram of a wireless communication system with a base station system deployed in a CPRI daisy chain configuration in accordance with selected embodiments of the present disclosure.

A system, apparatus, and methodology are described for automatically controlling the insertion of information flow data (e.g., User Plane data, Control & Management (C&M) Plane data, and Synchronization Plane data) over a shared link (e.g., a Common Public Radio Interface (CPRI) link) by providing a hardware control mechanism at a local device (e.g., an RE, device connected in a CPRI daisy chain configuration between an upstream REC device and a downstream RE device) for determining whether each basic frame hit being transmitted is sourced from an upstream device (e.g., forwarded data from an upstream RE device) or from the local device. In selected embodiments, the hardware control mechanism may be implemented in the transmitting CPRI unit of a local RE/REC device with a plurality of multiplexer output circuits, each of which is connected to receive a first input (of forwarded transmit data from an upstream RE/REC device) and a second input (of local transmit data from the local RE/REC device). The outputs from the multiplexer output circuits are controlled by bits from a mask register and a mask update module to transmit the first input if the corresponding mask register value has a first value (e.g., 1), and to transmit the second input if the corresponding mask register value has a second value (e.g., 0). In this way, the mask registers will be bypassed, and the whole control word will be generated and transmitted from the local device (the second input). To avoid the overhead costs associated with using software to reprogram and update the mask registers at each basic frame boundary, the mask update module includes one or more mask update registers for storing control bits corresponding to one or more words in each basic frame. For example, the mask update registers may be implemented as 8×32-bit control word mask update registers which store control bits that map to the control words for basic frames 0 to 255. In operation, the mask update module may scan the mask update register at the boundary of each basic frame to find the control bit for a selected word in the basic frame, and use the selected control bit to update the mask register by setting all mask register bits for the corresponding word (e.g., a first control word) to a "local transmit" value (e.g., 0) if the control bit has a first control bit value (e.g., 0). With the disclosed hardware control mechanism, software statically programs the mask update registers once during initial configuration of the CPRI link, thereby enabling on-the-fly switching of the information flow over a CPRI link at each basic frame boundary while avoiding software latencies and redundancies associated with using software intervention to reprogram the mask registers at every basic frame boundary. In selected embodiments, a pair of control word mask update modules may be used for the uplink daisy chain and downlink daisy chain CPRI links.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the circuit designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

In this disclosure, Applicants have provided an improved system, apparatus, and method for transferring information over a common interface between base station radio equipment and/or control devices that address various problems in the art where various limitations and disadvantages of conventional solutions and technologies will become apparent to one of skill in the art after reviewing the remainder of the present application with reference to the drawings and detailed description which follow.

Turning now to FIG. 1, there is shown a simplified block diagram of a wireless communication system 100 that includes a plurality of wireless devices or subscriber stations 102, 122 (e.g., hand-held computers, personal digital assistants (PDAs), cellular telephones, etc.) that wirelessly communicate with one or more base station systems (BSS) 110 enhanced Node-B or eNB devices). Each wireless devices (e.g., 102) may include a processor 108 (e.g., a digital signal processor), a transceiver 106 connected to one or more antennas 109, and one or more input/output devices 104 (e.g., a camera, a keypad, display, etc.), along with other components (not shown). The wireless devices 102, 122 use attached antennas 109, 129 to wirelessly communicate with the base station system (BSS) 110 via antennas 120, 121 to receive or transmit voice, data, or both voice and data.

In the depicted arrangement, the base station system 110 is composed of two basic subsystems or nodes—the radio equipment control device and the radio equipment device. The illustrated REC devices include one or more baseband unit(s) (BBU) 111, 113. In addition, the illustrated RE devices may include one or more remote radio head (RRH) units 115, 118 connected to one or more antennas 120, 121. The radio equipment subsystems or nodes in the BSS 110 may be connected together in a variety of network topologies using one or more CPRI links. For example, the baseband units 111, 113 and remote radio head devices 115, 118 may be deployed in a CPRI daisy chain configuration by using CPRI links 112, 114, 117 to sequentially connect the baseband unit(s) 111, 113 and RRHs 115, 118 in a chain. Each CPRI link 112, 114, 117 connects two subsystem ports (a master port and a slave port) which have asymmetrical functions and roles for selected interface flows, so that, under normal conditions, a link has always one master port and one slave port.

In the embodiments shown, each RRH 115, 118 includes a base station processor 116, 119 (e.g., digital front end (DFE)) which may be implemented as a single integrated circuit to provide the digital components of the cellular base station RE subsystem. The digital components consolidated on each base station processor 116, 119 may include one or more control processors and digital transmit/receive filters, as well as interface peripherals and other I/O for RF subsystem functions. In addition and as described more fully below, each base station processor 116, 119 may include one or more CPRI transmit modules having a hardware control mechanism for automatically controlling the insertion of information flow data (e.g., User Plane data, Control & Management (C&M) Plane data, and Synchronization Plane data) over a shared CPRI link by using a multiplexer output circuit that is controlled by a mask register and a mask update module.

Figure 2:
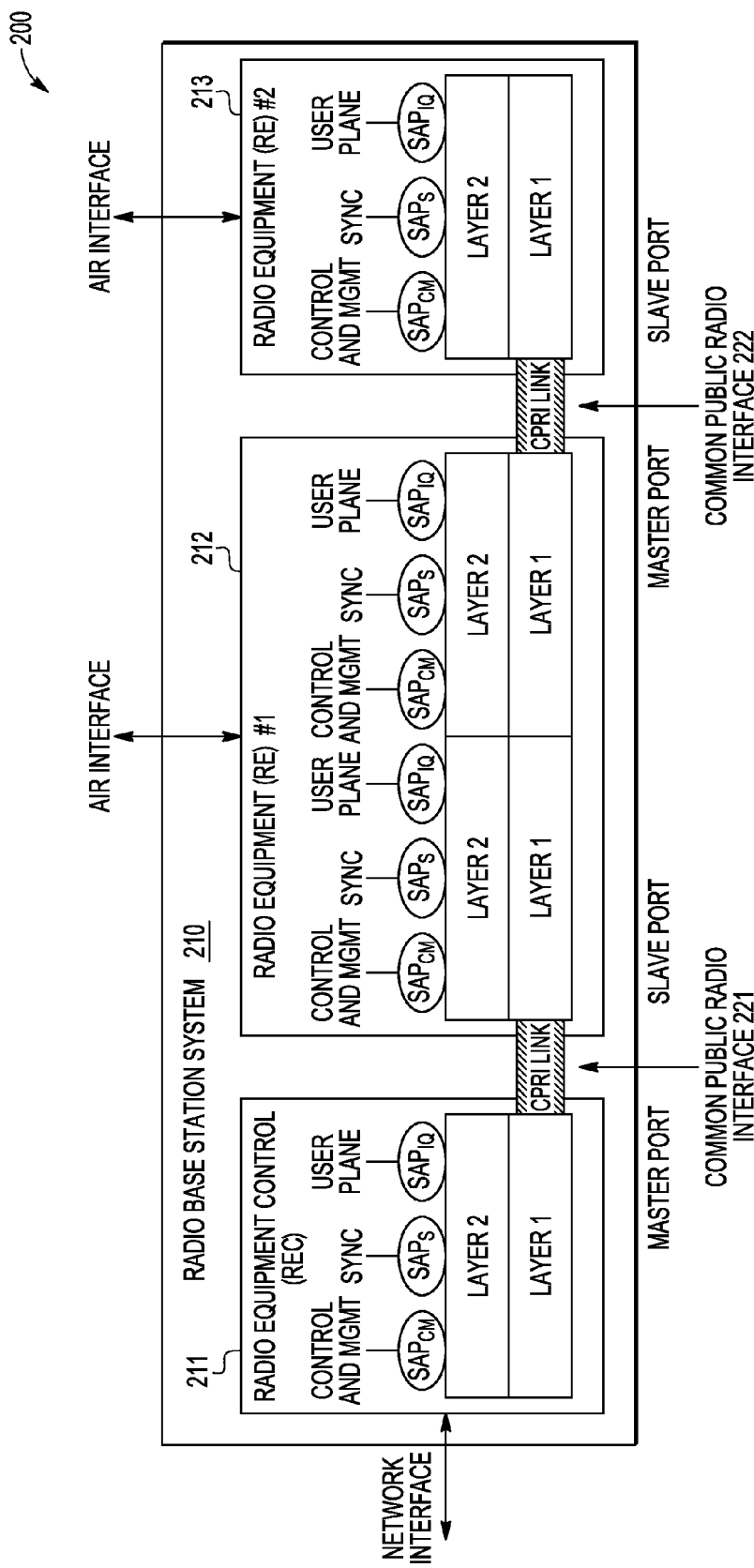
FIG. 2 is a block diagram illustration of a basic system architecture for linking radio equipment devices in a CPRI daisy chain configuration.

To further illustrate the hardware-based information flow techniques disclosed herein, reference is now made to FIG. 2 which is a high level block diagram illustration of a basic system architecture 200 for a base station system 210 which links radio equipment devices 211-213 in a network topology. In particular, a first REC device 211 is connected with first and second RE devices 212, 213 in a CPRI daisy chain configuration to provide a distributed antenna system for the radio base station 210. To this end, the first REC device 211 and first RE device 212 are connected by a first serial data link 221, and the first RE device 212 and second RE device 213 are connected by a second serial data link 222. The Layer 1 and the Layer 2 blocks represent the communication functions between the radio equipment devices 211-213. In selected embodiments, the serial data links 221, 222 may be implemented as CPRI links, though other interface specifications may be used, including but not limited to the Open Base Station Architecture Initiative (OBSAI) specification or another proprietary specification.

As will be appreciated, the REC device 211 and one or more RE devices 212, 213 may be physically separated. In addition, each of the RE devices 212-213 may be connected with one or more antennas to provide an air interface for exchanging radio signals to UEs in the network vicinity. In selected embodiments, the REC device 211 is connected over a network interface to a radio access network (RAN), and may be co-located with the first RE device 212 at the head end, while one or more second RE devices 213 are installed at remote locations. In this arrangement, the REC device 211 provides radio equipment control functions (such as Iub transport and protocols, eNode B control and management, and the baseband processing), and also provides downlink operations (such as channel coding, interleaving, spreading, scrambling, adding of physical channels, controlling transmit power of each physical channel, frame and signal slot generation, etc.) and uplink operations (such as channel de-coding, de-interleaving, de-spreading, de-scrambling, signal distribution, detection of feedback information for transmit power control, signal to interference ratio measurement, etc.). Each RE device 212, 213 provides an air interface processing functions (such as digital-to-analog (D/A) conversion, analog-to-digital (A/D) conversion, filtering, modulation, frequency conversion, carrier (de)multiplexing, power amplification, automatic gain control, etc.). The functional split between the REC device 211 and the RE devices 212-213 allows the transfer of digital baseband samples representing user data via the serial data link 221, 222, where the digital baseband samples include in-phase and quadrature (I,Q) samples representing the user plane data.

In selected embodiments, the serial data links 221-222 comply with the CPRI specification which defines protocols for transferring user data, control and management data, and synchronization information between the REC 211 and an RE device 212, and between difference RE devices 212, 213. Layer 1 specifications include the line transmission bit rates, electrical characteristics, optical characteristics, line coding, time division multiplexing of the different data flows, frame structure and low level signaling. Layer 2 specifications include control and management data, data mapping, media access control, data flow and protection of the control and management data. Generally, the CPRI defined protocols include a time division multiplexed container protocol, which is provisioned to transmit streams of signal samples in a point to point channel, such as between the REC and corresponding antenna-carriers being operated using the RE of the system, and user equipment operating on such antenna-carriers. Thus, in addition to the user plane (I,Q data), the CPRI specification defines an arrangement of C&M information as well as synchronization signals for exchange between REC device 211 and the RE device(s) 212, 213. With the CPRI protocols, all information streams are multiplexed onto the digital serial communication line(s) 221, 222 at each port (e.g., master port or slave port) using the Layer 1 and Layer 2 protocols. The different information flows have access to the Layer 2 via service access points (SAPs) at each device, including a control & management SAP ($SAP_{CM}$), synchronization SAP ($SAP_S$), and a user plane SAP ($SAP_{IQ}$). This defines the common public radio interface links 221, 222 illustrated in FIG. 2.

Figure 3:
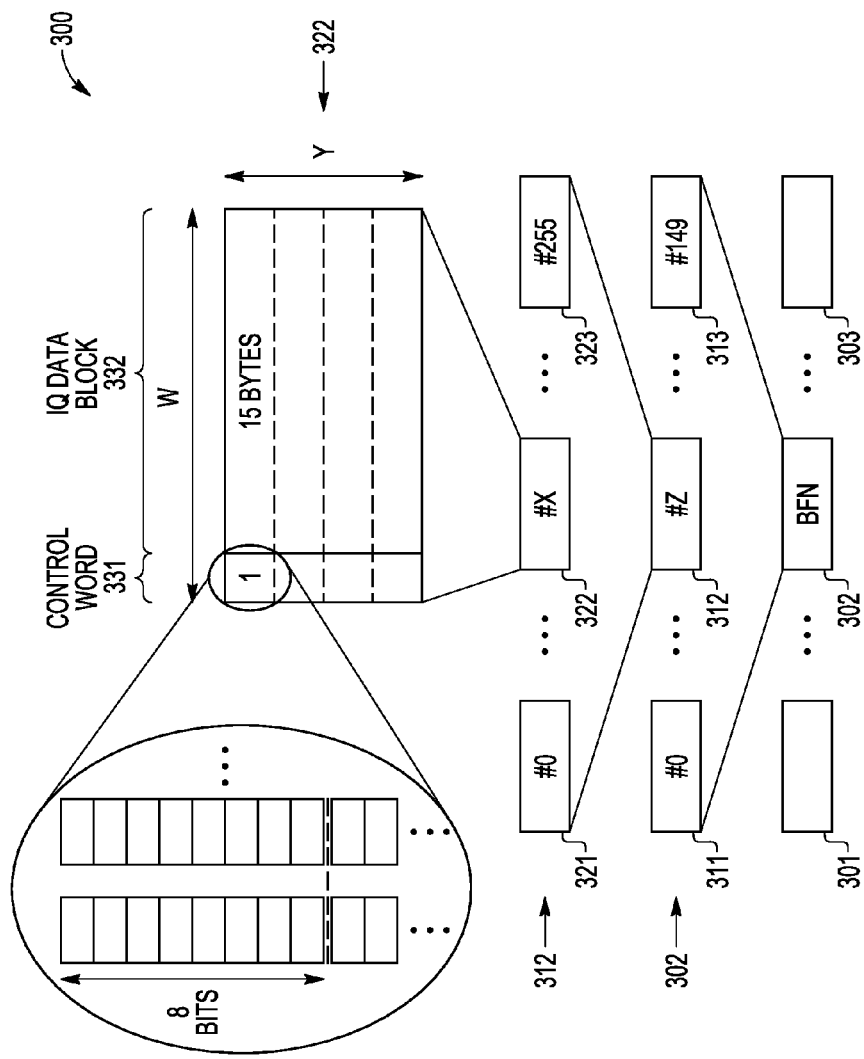
FIG. 3 is a diagrammatic illustration of the CPRI hierarchy frame structure.

Turning now to FIG. 3, there is depicted a diagrammatic illustration of the CPRI hierarchy frame structure 300 where a sequence of basic frames 321-323 form a hyperframe 312, and where a sequence of hyperframes 311-313 form a CPRI 10 msec. frame 302 (a.k.a., a Node B frame). In the depicted example, each CPRI 10 msec. frame 301-303 (a.k.a., UMTS radio frame) is assigned a Node B frame number (BFN), and is formed with a sequence of 150 hyperframes 311-313 having indices #0 to #149, where hyperframe 312 has index #Z. In similar fashion, each hyperframe (e.g., 312) is formed with a sequence of 256 basic frames 321-323 having indices #0 to #255, where basic frame 322 has index #X. Finally, each basic frame (e.g., 322) has a basic frame structure that includes 16 words, with index W ranging from 0 to 15. The first word (word index=0) in each basic frame is reserved as the control word, regardless of the size of the word, and the remainder of the words are used for user data blocks. The length of the word with index B varies based on the CPRI line bit rate. For example, the illustrated basic frame structure for the basic frame 322 is for the 2457.6 Mbps line rate (CPRI line bit rate option 3), where each word has a length 4 bytes, or 32 bits per word. Thus, for the 2457.6 Mbps line rate (CPRI line bit rate option 3), the basic frame carries 64 bytes, including 4 bytes for control information in the first control word, and 60 bytes for signal samples in the user data block. Because the duration of the basic frame is constant, the same hierarchy applies to all CPRI line bit rates, although the number of bits per basic frame varies with the line rates. Thus, each byte within a word is addressed with index Y ranging 0 to 3, depending on the line bit rate. As a result, 256 basic frames 321-323 form a hyperframe 312 with index Z, and 150 hyperframes 311-313 form a UMTS radio frame 302. CPRI denotes the hyperframe number as HFN and UMTS radio frame number as node B frame number (BFN). In the CPRI specification, each byte is denoted as #Z,X,Y.

Figure 4:
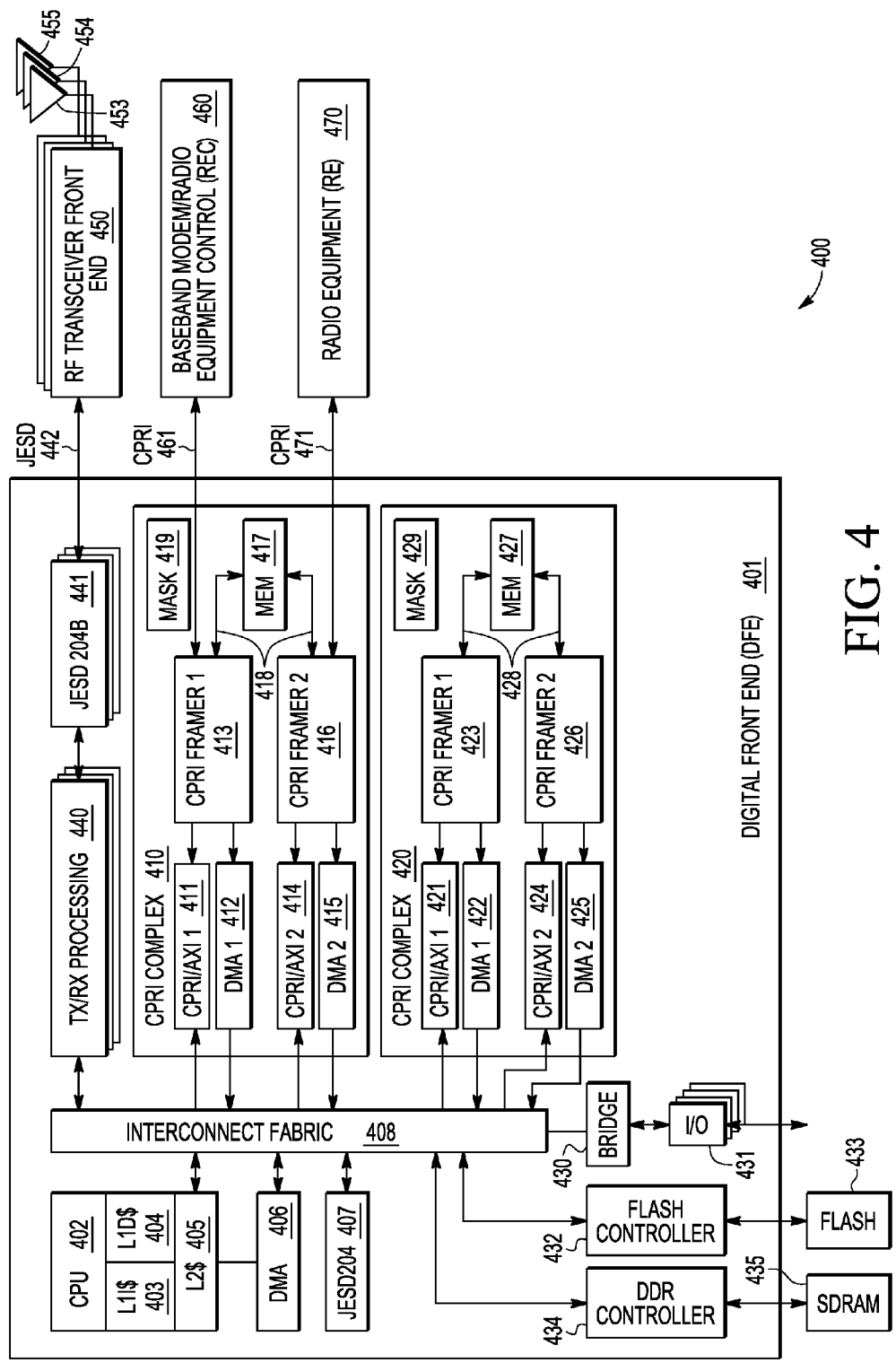
FIG. 4 is a block diagram illustration of a multi-antenna radio frequency (RF) subsystem with a single chip base station processor having integrated CPRI complex hardware for automatically controlling the insertion of CPRI control words.

To further illustrate the techniques for controlling information flow data over a shared link disclosed herein, reference is now made to FIG. 4 which is a block diagram illustration of a base station system 400 including a plurality of base station subsystems connected to one another. One of the base station subsystems is a multi-antenna radio frequency (RF) subsystem that includes a single chip base station processor 401 (e.g., DFE) connected over one or more RF transceiver front end circuits 450 to one or more antennas 453-455. In other embodiments, the basic design of the base station processor 401 could also be used to implement a radio equipment control device without requiring the JESD 204B interface 441 and associated connectivity. As will be appreciated, a radio transceiver front end 450 may be understood to refer to all RE conversion circuitry between the antenna and the first intermediate frequency (IF) stage, including analog and digital receiver components (e.g., digital-to-analog converters, low pass filters, oscillators, splitters, mixers, amplifiers, etc.) that process the signal at the original incoming radio frequency (RF) before it is converted to a lower intermediate frequency (IF). As described herein, the base station processor 401 includes an integrated CPRI complex hardware 410, 420 for automatically controlling the insertion of CPRI control words. The RF base station subsystem 401 is connected between an upstream base station subsystem 460 and a downstream base station subsystem 470. For example, the upstream base station subsystem 460 may be a baseband modem that provides a radio equipment control (REC) function, while the downstream base station subsystem 470 may be a remote radio head device that provides a radio equipment (RE) device having its own RF transceiver front end circuitry and antenna(s) (not shown).

The depicted base station processor 401 (e.g., DFE) is provided to perform digital signal processing for the RF base station subsystem across the transmit and/or receive antennas 453-455. To this end, the base station processor 401 partitions transmit and receive signals to and from the antennas 453-455 into transmit processing paths and receive processing paths 140, 441, and communicates with the baseband modem 160 and/or RE device 470 through the Common Public Radio Interface (CPRI) interface 410. The base station processor 401 may include one or more control processors 402 (e.g., one or more ARM processor cores), memory subsystems (e.g., L1 instruction cache 403, L1 data cache 404, L2 cache 405), memory controllers (e.g., DMA controller 406, flash controller 432, and DDR controller 434) for interfacing with external memory (e.g., Flash memory 433, SDRAM 435), one or more modem interfaces (e.g., CPRI interfaces 410, 420 and JESD204A/B interface 407), and I/O facilities (e.g., host bridge 430) for I/O devices 431. As a general matter, any of a variety of memory designs and hierarchies may be employed in, or in conjunction with, with the base station processor 401. Also, it will be appreciated that the I/O devices 431 may include any desired I/O device, such as Ethernet, I2C, SPI, GPIO, and/or UART devices. All processor subsystems are linked by a multi-level interconnect fabric 408.

To digitally process transmit signals, the base station processor 401 may also include one or more programmable transmit/receive signal processing paths to the antenna 453-455 which is formed with a transmit/receive signal processor 440 and an associated serialized interface 441 (e.g., a JESD204BTX or JESD204BRX interface) and RF transceiver front end 450. The transmit/receive signal processor 440 may include one or more processors (e.g., vector processors) and associated memory (e.g., RAM) for performing carrier-related signal processing and antenna-specific processing on IQ samples. Once signal processing is completed, the transmit signal processor 440 may send the processed IQ samples to an associated serialized interface (e.g., JESD204B TX 441) for transfer to the transceiver 450 over JESD signal lines 442. In similar fashion, signals received at the antennas 453-455 and sent over the JESD204B RX interface 441 may be digitally processed at the receive signal processor 440 to generate IQ samples.

As shown in FIG. 1, the base station processor 401 may be connected between the upstream base station subsystem 460 (e.g., baseband modem) and downstream base station subsystem 470 (e.g., remote radio head) in a daisy chain configuration using the CPRI bus links 461, 471. To support these CPRI connections, the base station processor 401 includes one or more CPRI complexes or modules 410, 420, each of which includes two CPRI links (e.g., 461, 471) that may be configured as a master or a slave port. Each CPRI complex 410, 420 also includes a pair of CPRI framer units (Framer 1, Framer 2) connected through their auxiliary interfaces to an auxiliary memory. For example, a first CPRI complex 410 includes CPRI framers 413, 416 connected across auxiliary interfaces 118 to the auxiliary memory 417. The CPRI framers 413, 416 construct CPRI frame structures and manage the transmission of CPRI frames over the serial links 461, 471. The CPRI Framers 413, 416 also extract payload data and Control & Management (C&M) data from the received CPRI frames. Receive and transmit IQ data samples are transferred in and out of CPRI complex 410 through the AXI slave ports of the CPRI-to-AXI (CAXI) modules 411, 414. Each CAXI module 411, 414 is a bridge that allows IQ data to pass between the CPRI complex 410 and external processors (e.g., vector signal processors in the transmit/receive processing module 440) by converting CPRI IQ samples to the AXI bus format, and vice versa. Other data (e.g., Ethernet, vendor specific, and HDLC data) may be transferred to or from system memory by using the CPRI DMA modules 412, 415 which function as the master of the interconnect fabric bus system 408. Over the interconnect fabric 408, the central processing unit (CPU) 402 may access the internal registers of the CPRI complex 410, 420. The other instance of the CPRI complex 420 has a matching structure with CPRI framer units 423, 426 respectively connected across CAXI modules 421, 424 and DMA modules 422, 425 to the interconnected fabric 408, and connected across auxiliary interfaces 428 to the auxiliary memory 427.

In a CPRI daisy chain topology where the base station processor 401 is configured as a local RE device in the chain, one of the CPRI framer units (e.g., 460) in the CPRI complex 410 is configured as the master, the other CPRI framer unit (e.g., 470) is configured as the slave such that the framer units 413, 416 are connected across auxiliary interfaces 418 to the auxiliary memory 417. In this configuration, each CPRI bus link 461, 471 will function at times as a shared CPRI link, meaning that the CPRI link is used to transfer data from both the base station processor 401 and one of the radio subsystems connected thereto as an information flow source. For example, upon receiving a CPRI frame from a previous or downstream node on the chain (e.g., RE device 470), the receiving CPRI framer unit 416 selects the control data and IQ data belonging to the local RE device 401 and transfers them to the local system memory (not shown). At the same time, the receiving framer unit 416 forwards the whole CPRI frame to the companion or transmitting CPRI framer unit 413. At the transmitting CPRI framer unit 413, the processor 402 will insert control data, but the TX/RX processors will insert IQ data in any time slot in the CPRI basic frame before sending the CPRI frame with the updated contents to the next node 460 on the chain.

One mechanism for supporting the insertion of control words by the local RE device is to include one or more mask registers 419, 429 for each transmitting CPRI framer unit. When each mask register is sized to store the number of bits in a basic frame, the mask register values may be applied as control inputs for an output multiplexer circuit (not shown) in the transmitting CPRI framer unit. Each output multiplexer circuit is connected to receive two inputs for selection. A first input is from the auxiliary memory (e.g., 417), and conveys forwarded data from the previous or downstream RE device (e.g., 470). The second input is from the local memory at the base station processor 401, and conveys data to be inserted from the local RE device 401. With this configuration, the mask register 419 determines whether each bit in the transmitting basic frame is forwarded from the previous or downstream RE device 470, or is inserted by the local RE device 401.

As will be appreciated, the IQ data path may be repeated across each basic frame, meaning that the IQ data mask register(s) remain unchanged going from one basic frame to another. In contrast, control data is repeatable at the hyper frame level. As a result, with 256 Control Words (CW) in each hyper frame, there are some use cases where the source of the CW changes from one basic frame to the next basic frame. For example, CW200 is forwarded from the previous RE device 470, and CW201 is inserted by the local RE device 401. In order to support this requirement, the system must have the ability to update the mask register 419 of the CW at each basic frame boundary. If this task is done with a software operation, there can be inefficiencies and delay problems resulting from programming latencies in reprogramming the mask register(s) 419. For example, with software-based mask register updates, the CPU 402 must finish reprogramming the mask register 419 within 260 usec (1 basic frame), undo the reprogramming one basic frame later, and repeat these steps every 66.7 usec (1 hyper frame).

Figure 5:
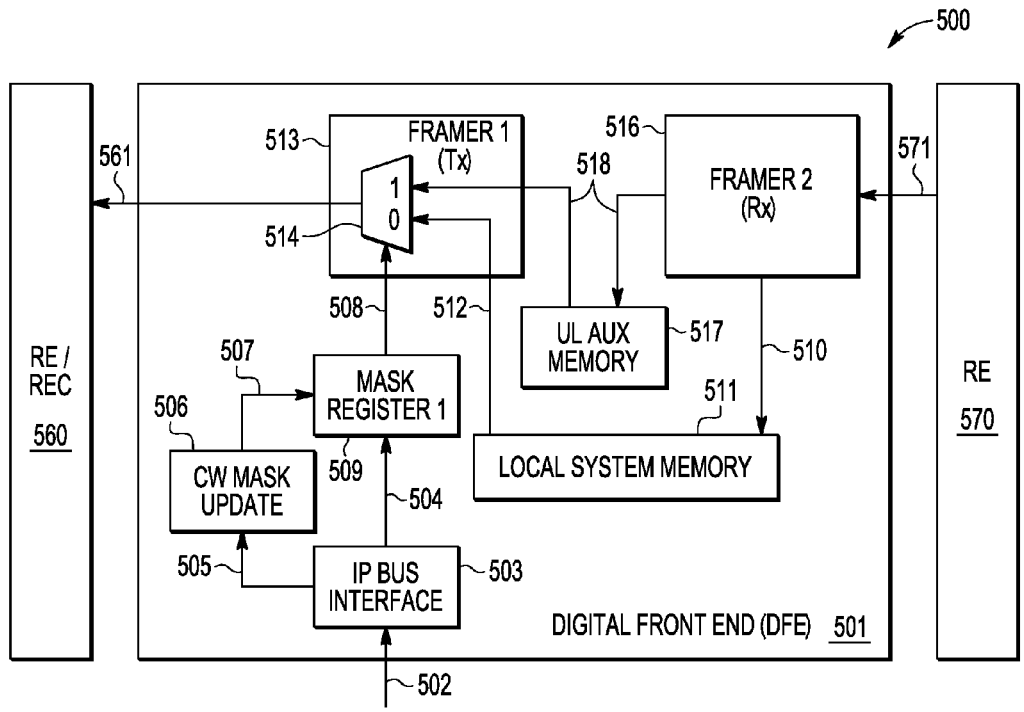
FIG. 5 is a block diagram illustration of a control word update mask module which manages a control word mask in the uplink daisy chain data flow.

The requirement for software intervention (and associated latencies and redundancies) may be eliminated by providing each CPRI complex 410, 420 in the base station processor 401 with dedicated mask update registers and associated update hardware which allow the CPU 402 to statically program mask update registers for selected words (e.g., the control words) in each of the 256 basic frames during link reconfiguration time so that the update hardware can control switching the path of the selected control words on-the-fly at the basic flame boundary without software intervention. To illustrate selected embodiments of the dedicated mask update registers and associated update hardware, reference is now made to FIG. 5 which depicts a block diagram 500 of a base station processor 501 (e.g., DFE 501) connected between a first base station subsystem 560 (e.g., RE or REC device) and a second base station subsystem 570 (e.g., RE device) in a daisy chain configuration using the CPRI bus links 561, 571, respectively. In this configuration, the base station processor 501 is described as a local RE device 501, but it will be appreciated that the base station processor 501 may also function as a REC device when connected to an upstream REC device 560, or may be implemented as either a REC device or RE device, depending on the connection and function of the device. To support these CPRI connections as master and slave port connections (depending on the direction of data flow), the base station processor 501 includes first and second CPRI framer units 513, 516 (Framer 1, Framer 2) connected through their auxiliary interfaces 518 to an auxiliary memory 517. Upon receiving a CPRI frame from the previous node (e.g., RE device 570) on the chain, the receiving CPRI framer unit 516 at the master port 671 selects the control data and IQ or antenna carrier data belonging to the local RE device 501, and transfers them over signal line 510 to the local system memory 511. At the same time, the receiving CPRI framer unit 516 forwards the whole CPRI frame to the uplink auxiliary memory 517 for delivery to the companion or transmitting CPRI framer unit 513 at the slave port 561. At the first CPRI framer unit 513, the processor at the local RE device 501 can insert control data and IQ data in any time slot in the CPRI basic frame before sending the CPRI frame with the updated contents to the next node (e.g., RE/REC device 560) on the chain.

In selected embodiments, the first CPRI framer unit 513 includes output multiplexer circuitry 514 for inserting control words in the uplink daisy chain data flow. The output multiplexer circuitry 514 is connected to receive two inputs for selection in response to a control signal 508 from a first mask register 509. The first input is from the auxiliary memory 517 which stores forwarded data from the previous RE device 570. The second input is from the local memory 511, and conveys data to be inserted from the local RE device 501. To control the selection of which input is conveyed over the CPRI bus link 561, the first mask register 509 stores values that are applied as control inputs 508 for the output multiplexer circuitry 514 in the transmitting CPRI framer unit 513. In selected embodiments, the mask register 509 is sized to store the number of bits in a basic frame so that each bit in a transmitted basic frame may be controlled at the output multiplexer circuitry 514 to be forwarded data from the previous RE device 570 through the auxiliary interface/memory 517, 518, or to be inserted into the transmitting CPRI framer unit 513 by the local RE device 501.

In selected daisy chain configurations, the control word bits in the mask register 509 may require updating in one or more selected basic frames, such as by inserting control word data from the local system memory 511 at the local RE device 501. To automatically control the insertion of control word, a control word mask update module 506 is provided which allows the microcontroller unit (MCU) to statically program the mask update of 256 control words in the hyper frame. To this end, the control word mask update module 506 may include an update bitmap stored in one or more control word mask update registers, where each bit in the update bitmap uniquely maps to one of the basic frames. In selected embodiments, the control word mask update registers 506 may be implemented as 8×32-bit registers, or 256 bits total, where each bit maps to a basic frame 0 to 255. Using the update bitmap, the control word mask update module 506 is connected to manage the first mask register 509 to output a control signal 508 which causes the output multiplexer circuitry 514 to insert the desired control word(s) 512 from local system memory 511.

In operation, the control word mask update module 506 scans the proper bit of the control word mask update registers at the boundary of the current basic frame. If the bit value corresponding to the control word for the current basic frame is '0,' the control word mask update module 506 issues a control signal 507 that sets all bits in the first mask register 509 of that control word to '0.' In other words, the control signal 507 causes the first mask register 509 to generate the control word section of the basic frame (e.g., the first 8 to 128 bits depending on the CPRI rate) to be all 0's based on scanning the proper bit of the control word mask update register, thereby controlling the output multiplexer circuitry 514 to insert the desired control word(s) 512, from local system memory 511. However, if the bit value corresponding to the control word for the basic frame is '1,' the control word mask update module 506 issues a control signal 507 which instructs the first mask register 509 to use the default values programmed in the first mask register 509 for the control word of the current basic frame. If the bit value from the mask register 509 is "1," the output multiplexer circuitry 514 selects the input from the auxiliary memory 517.

As will be appreciated, a variety of hardware control mechanisms may be used to control the control word section of the basic frame in response to the control signal 507. For example, each of the control word bits from the first mask register 509 may be connected to the '0' input of a multiplexer selection circuit, where the multiplexer selection circuit also has a value connected to the '1' input. By scanning the bitmap value in the control word mask update register(s) that corresponds to the current basic frame, and applying the bitmap value as a control signal to the multiplexer selection circuits corresponding to the control word in the current basic frame, the multiplexer selection circuits will generate a control word section for the current basic frame that is all 0's if the bitmap value is '0,' or all 1's if the bitmap value is '1.'

With this arrangement, the controller/MCU/CPU only needs to program the control word mask update registers 506 once until the new configuration is loaded, thereby avoiding software latencies and redundancies associated with reprogramming the first mask register 509 at each basic frame boundary. The internal registers 506, 509 may be accessed by the controller/MCU/CPU which sends register programming update signals 502 to the IP bus interface 503 for distribution over register update line 504 to the first mask register 509 and for distribution over register update line 505 to the control word mask update registers 506.

Figure 6:
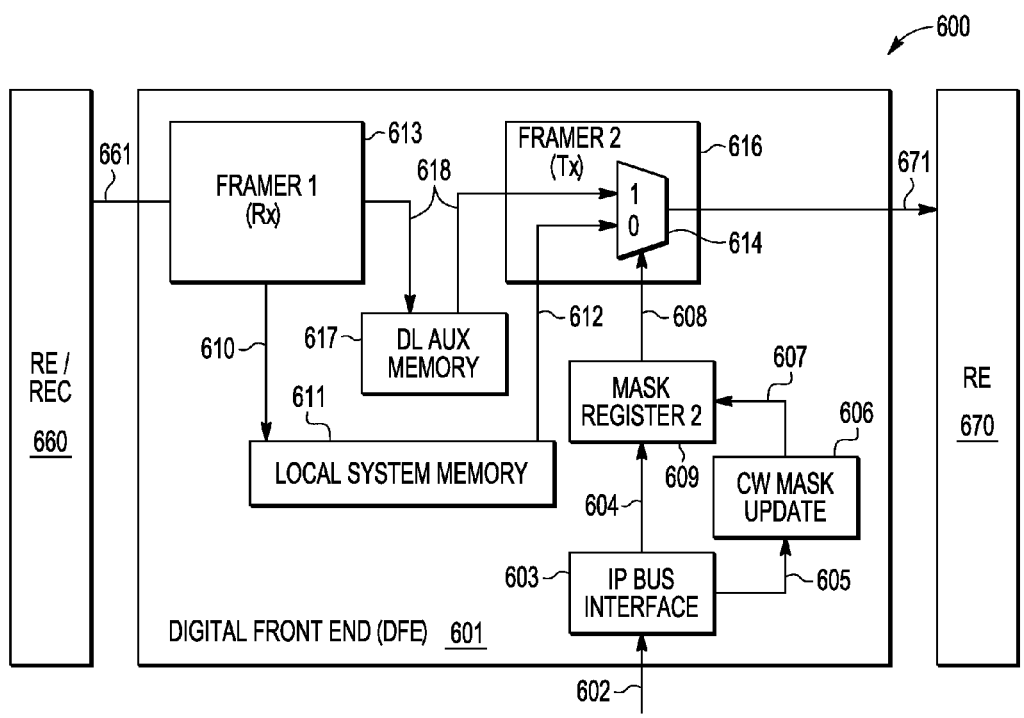
FIG. 6 is a block diagram illustration of a control word update mask module which manages a control word mask in the downlink daisy chain data flow.

Dedicated mask update registers and associated update hardware may also be used to manage the downlink daisy chain data flow by allowing the CPU controller/MCU/CPU to statically program mask update registers for selected words (e.g., the control words) in the transmitted downlink basic frames. Selected embodiments are illustrated in FIG. 6 which shows a block diagram 600 of a base station processor 601 (e.g., DFE) connected between a first base station subsystem 660 (e.g., RE or REC device) and a second base station subsystem 670 (e.g., RE device) in a daisy chain configuration using the CPRI bus links 661, 671, respectively. In this configuration, the base station processor 601 is described as a local RE device 601, thought it may also function as an REC device when connected to an upstream REC device 660, or may be implemented as a networking REC/RE device, depending on the connection and function of the device. To support these CPRI connections 661, 671, the base station processor 601 includes a first CPRI framer unit 613 connected by a slave port to the upstream CPRI link 561, and a second CPRI framer unit 616 connected by a master port to the downstream CPRI link 571. The first and second CPRI framer units are also connected through their auxiliary interfaces 618 to an auxiliary memory 617. Upon arrival of a new CPRI frame from the previous node (e.g., RE/REC device 560) on the chain, the slave CPRI framer unit 613 selects the control data and IQ or antenna carrier data belonging to the local RE device 601, and transfers them over signal line 610 to the local system memory 611. The receiving CPRI framer unit 613 also forwards the whole CPRI frame to the uplink auxiliary memory 617 for delivery to the master or transmitting CPRI framer unit 616. At the master CPRI framer unit 616, the processor at the local RE device 601 can insert control data and IQ data in any time slot in the CPRI basic frame before sending the CPRI frame with the updated contents to the next node (e.g., RE device 670) on the chain.

To support control word insertion, the master CPRI framer unit 616 may include output multiplexer circuitry 614 for inserting control words in the downlink daisy chain data flow. The output multiplexer circuitry 614 is connected to receive two inputs for selection in response to a control signal 608 from a second mask register 609. The first input from the uplink auxiliary memory 517 provides forwarded data from the previous RE/REC device 660. The second input from the local memory 611 conveys data to be inserted from the local RE device 601. To select between the first and second inputs, the second mask register 609 stores values that are applied as control inputs 608 for the output multiplexer circuitry 614, where the mask register 509 may be sized to store the number of bits in a basic frame. In this way, each bit in a transmitted basic frame may be controlled at the output multiplexer circuitry 614 to be either forwarded data from the previous RE/REC device 560 through the auxiliary interface/memory 617, 618, or to be inserted into the master CPRI framer unit 616 by the local RE device 601.

To automatically control the insertion of control word in each transmitted basic frame, a control word mask update module 606 provides a hardware control mechanism which allows the controller (e.g., MCU or CPU) to statically program the mask update of 256 control words in the hyper frame. To this end, the control word mask update module 606 may include an update bitmap stored in one or more control word mask update registers (e.g., 8×32-bit registers), where each bit in the update bitmap uniquely maps to one of the basic frames 0 to 255. Using the update bitmap, the control word mask update module 606 is connected to manage the second mask register 609 to output a control signal 608 which causes the output multiplexer circuitry 614 to insert the desired control word(s) 612 from local system memory 611. This may be implemented by having the control word mask update module 506 scan the proper bit of the control word mask update registers at the boundary of the current basic frame if the bit value corresponding to the control word for the current basic frame is '0,' the control word mask update module 606 issues a control signal 607 that sets all bits in the second mask register 609 of that control word to '0.' In other words, the control signal 607 causes the second mask register 609 to generate the control word section of the basic frame (e.g., the first 8 to 128 bits depending on the CPRI rate) to be all 0's based on scanning the proper bit of the control word mask update register, thereby controlling the output multiplexer circuitry 611 to insert the desired control word(s) 612 from local system memory 611. However, if the bit value corresponding to the control word for the basic frame is '1,' the output multiplexer circuitry 614 selects the input from the auxiliary memory 617.

Figure 7:
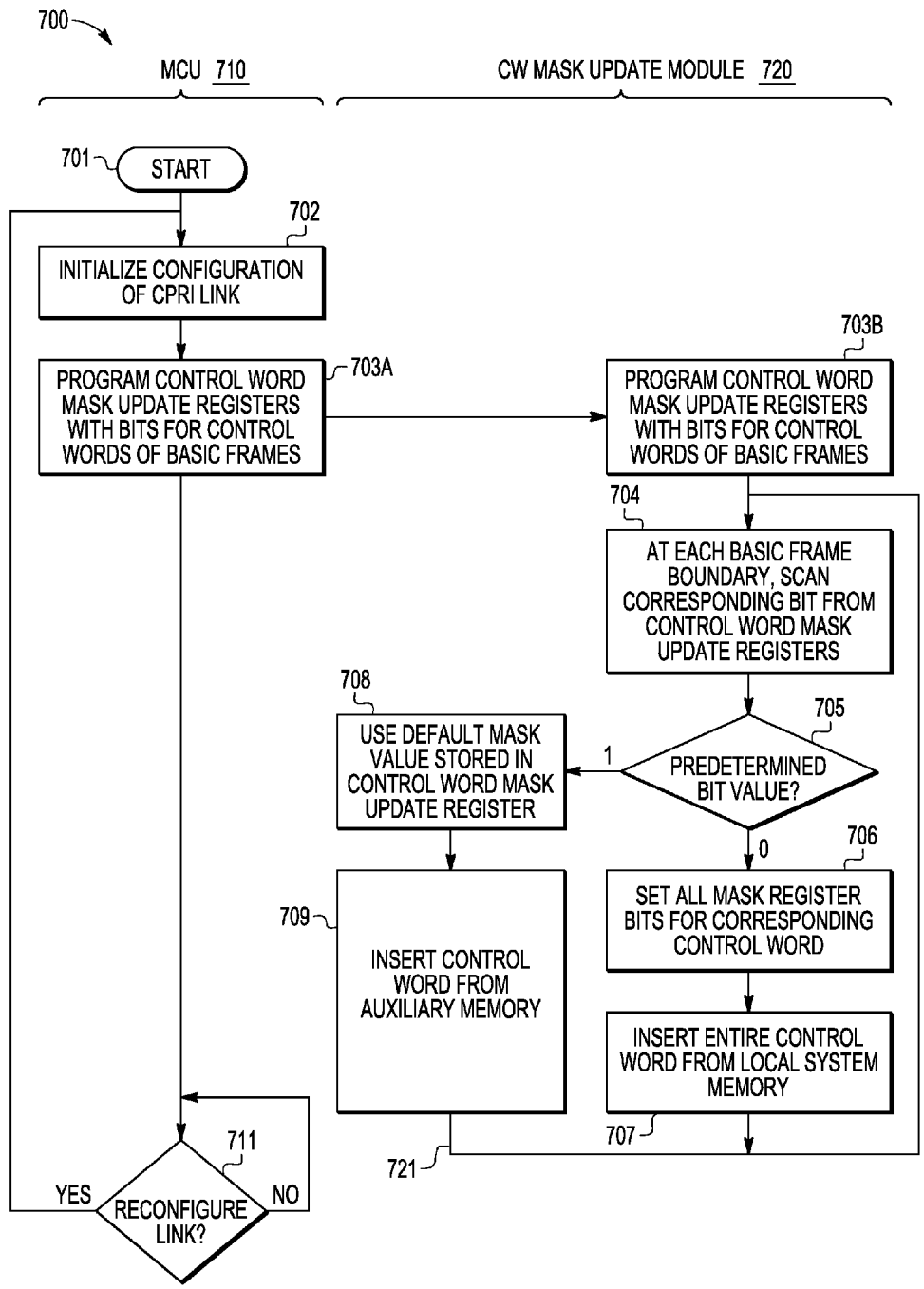
FIG. 7 shows an example flow diagram of a method for programming and using control word mask update registers to provide a hardware solution for using the base station processor to implement a CPRI daisy chain configuration.

Referring now to FIG. 7, there is depicted an example flow diagram 700 of a method for programming and using control word mask update registers to provide a hardware solution for using the base station processor to implement a CPRI daisy chain configuration in accordance with selected embodiments of the present disclosure. In the flow diagram 700, the method steps performed by the CPU or MCU controller are aligned under the MCU controller 710, while the method steps performed by the mask update hardware module are aligned under the CW Mask Update Module 720. In selected embodiments, the mask update hardware module may be implemented in a transmitting CPRI framer unit with one or more multiplexer circuits connected to receive a first input (of forwarded transmit data from a previous node) and a second input (of local transmit data from the local node), where the multiplexer circuit outputs are controlled by bits from a mask register and a mask update module to transmit the first input if the corresponding mask register value has a first value (e.g., 0), and to transmit the second input if the corresponding mask register value has a second value (e.g., 1).

Once the method starts at step 701, the CPRI links connected to a local RE device or local REC device have their configurations initialized as master or slave ports, depending on the connection topology. For example, in a CPRI daisy chain topology, one CPRI framer unit may be configured as an RE device (slave), and the other CPRI framer unit may be configured as an REC device (master), where the CPRI framer units are connected by an auxiliary interface and memory.

At steps 703A and 703B, the mask update registers at the mask update hardware module 720 are programmed by the controller MCU controller 710 with bits corresponding to selected words in each basic frame during link reconfiguration time. In selected embodiments where the selected words are the control words in each of the basic frames, programming step 703 is used to program control word mask update registers with a control word update bitmap having individual bitmap values corresponding to the control words in basic frames 0-255. As will be appreciated, step 703A refers to the programming activity at the MCU controller 710, and step 703B refers to the register activity at the mask update hardware module 720. In addition, mask registers for each transmitting CPRI framer unit may be programmed with default values for controlling the output of the transmitting CPRI framer unit. The controller MCU only needs to program these registers once during initial configuration of the CPRI link until a new configuration is loaded.

Once the mask registers and control word mask update registers have been programmed, the control word mask update module 720 scans the control word mask update register at each basic frame boundary to find the bitmap value corresponding to the current basic frame (step 704). For example, at the first basic frame boundary, the control word mask update module 720 scans the first bitmap value (index 0) in the control word mask update register, at the second basic frame boundary, the control word mask update module 720 scans the seventeenth bitmap value (index 16) in the control word mask update register, and so on.

At step 705, the control word mask update module 720 determines the value of the bitmap value corresponding to the control word for the current basic frame. If the bitmap is a predetermined value (e.g. '0' outcome from decision 705), all mask register bits for that control word are set (e.g., set to a value of '0') at step 706 so that the multiplexer circuit outputs local transmit data from the local node to effectively insert the whole control word (step 707). In this way, the mask update hardware control mechanism is provided in each CPRI framer unit which allows the controller MCU to statically program a mask update of 256 control words so that the hardware control mechanism is capable of switching the path of the control word on-the-fly at the basic frame boundary without software intervention.

Referring back to step 705, if the bitmap does not equal the predetermined value (e.g. '1' outcome from decision 705), the control word mask update module 720 instructs the multiplexer circuitry to insert control word from the auxiliary memory (step 709).

As indicated by the feedback path 721, the mask update hardware module 720 continues to operate with the programmed mask register values, and the MCU controller 710 is not involved with the control word path switching operations for so long as the CPRI link configuration applies (negative outcome to detection step 711). However, upon detecting that the CPRI links are to be reconfigured (affirmative outcome to detection step 711) the MCU controller 710 returns to CPRI initialization step 702 and the mask update register programming step 703 to statically reprogram the mask update of selected words (e.g., 256 control words in each hyperframe) to enable on-the-fly path switching at the basic frame boundary without software intervention.

As will be appreciated, the hardware control mechanism, system and methodology described herein provide a way to automatically control the insertion of information flow data (e.g., User Plane data, Control & Management (C&M) Plane data, and Synchronization Plane data) over a shared link (e.g., a CPRI link). In selected embodiments, the hardware control mechanism may be embodied in hardware as a controller, multiplexer, and one or more registers connected and configured to determine whether each basic frame bit being transmitted is sourced from an upstream device (e.g., forwarded data from a downstream RE device) or from the local device. In selected embodiments, the hardware control mechanism is initially programmed with mask update register values by processing circuitry (e.g., a processor or controller) executing software (e.g., including but is not limited to firmware, resident software, microcode, etc.) during link configuration. In addition, the programming of mask update registers may be embodied in whole or in part as a computer program product accessible from a computer-usable or computer-readable medium providing program code for use by or in connection with a computer or any instruction execution system, where a computer-usable or computer readable medium can be any apparatus that may include, store, communicate, propagate, or transport the program for use by or in connection with the instruction execution system, apparatus, or device. Examples of a computer-readable medium include a semiconductor or solid state memory, magnetic tape, a removable computer diskette, a random access memory (RAM), a read-only memory (ROM), a rigid magnetic disk and an optical disk, such as a compact disk-read only memory (CD-ROM), compact disk-read/write (CD-R/W) and DVD.

By now it should be appreciated that there has been provided a circuit, method and system for operating a local base station subsystem connected between first and second base station subsystems over first and second common interface links (e.g., CPRI serial interface links) in a daisy chain configuration. In selected embodiments, the local base station subsystem may be configured as a radio equipment controller device connected between the first base station subsystem configured as a radio equipment controller device and the second base station subsystem configured as a radio equipment device. In other embodiments, the local base station subsystem may be configured as a radio equipment device connected between the first base station subsystem configured as a radio equipment controller device and the second base station subsystem configured as a radio equipment device. In yet other embodiments, the local base station subsystem may be configured as a radio equipment device connected between the first base station subsystem configured as a radio equipment device and the second base station subsystem configured as a radio equipment device. In yet other embodiments, the local base station subsystem may be configured as a radio equipment control device connected between a first base station subsystem configured as a radio equipment control device and second base station subsystem configured as a radio equipment control device. In the disclosed system and methodology, one or more mask update registers are programmed to store an update bitmap with insert control values having either a first or second value, where each insert control value corresponds to one or more predetermined words in a corresponding basic frame. The mask update registers may be implemented as 8×32-bit mask update registers to store the update bitmap with 256 insert control values, where each of the 256 insert control values correspond uniquely to a control word in one of the plurality of basic frames. In addition, the mask update registers may be programmed during configuration of the first and second common interface links. After programming the mask update registers, an upstream radio data frame may be received from the first base station subsystem over the first common interface link, and selected IQ samples and control data from the upstream radio data frame may be stored in system memory of the local base station subsystem before switching into the upstream or downstream radio data frame one or more inserted words. With the mask update registers programmed, one or more inserted words from system memory of the local base station subsystem are switched into a downstream radio data frame for transmission to the second base station subsystem for each insert control value from the update bitmap having the first value by inserting at least a first inserted word into a first basic frame corresponding to a first insert control value having the first value. In addition, forwarded data from the first base station subsystem may be switched into the downstream radio data frame for each insert control value from the update bitmap having the second value. In other embodiments, the downstream radio data frame is assembled, for each insert control value from the update bitmap having the second value, by switching either forwarded data from the first base station subsystem or inserted data from system memory of the local base station, depending on selection values stored in a basic frame mask register.

In another form, there is provided an integrated circuit, method, and system for use at a local base station subsystem connected between first and second base station subsystems over first and second common interface links (e.g., CPRI links) in a daisy chain configuration. In the disclosed system and methodology, an auxiliary memory stores radio data frames from the first base station subsystem, and a local system memory stores one or more control words for insertion in a radio data frame. In addition, one or more mask update registers store an update bitmap with a plurality of insert control values having either a first or second value, where the plurality of insert control values correspond to one or more predetermined words in a corresponding plurality of basic frames for each radio data frame. The mask update registers may be implemented as eight (8) 32-bit mask update registers to store the update bitmap with 256 insert control values, where each of the 256 insert control values correspond uniquely to a control word in one of the plurality of basic frames. In operation, a serial data interface transmits radio data frames to the second base station subsystem by switching into each transmitted radio data frame one or more inserted control words from local system memory of the local base station subsystem for each insert control value from the update bitmap having the first value by inserting at least a first inserted control word into a first basic frame corresponding to a first insert control value having the first value. In selected embodiments, the serial data interface may include a plurality of multiplexer output selection circuits, each of which is connected to receive a first input from the auxiliary memory and a second input from the local system memory, and which receives a control signal from a mask register that is controlled by a corresponding mask update register. In addition, a control word mask update module may scan a bit in the update bitmap corresponding to a first control word for a current basic frame and set all bits in the mask register for the first control word to a predetermined value, thereby controlling the plurality of multiplexer output selection circuits to insert one or more control words from the local system memory. With this arrangement, a local processor at the local base station subsystem may be used to program the one or more mask update registers during configuration of the first and second common interface links. In addition, the local base station subsystem may be configured as a radio equipment control device or radio equipment device connected between a first base station subsystem and second base station subsystem.

In still yet other embodiments, there is disclosed an integrated circuit and associated method of operation for use with a local base station subsystem connected between first and second base station subsystems over first and second common interface links in a daisy chain configuration. The disclosed integrated circuit includes CPRI link for transmitting radio data frames to the second base station subsystem and a CPRI transmit serial interface for automatically controlling insertion of information flow data in the transmitted radio data frames. The integrated circuit also includes an auxiliary memory for storing radio data frames from the first base station subsystem, and a local system memory for storing one or more control words for insertion in a transmitted radio data frame. In addition, the integrated circuit includes a hardware control mechanism for determining whether each basic frame bit being transmitted in a transmitted radio data frame is sourced from the auxiliary memory or from the local system memory using one or more mask update registers for storing an update bitmap with a plurality of insert control values having either a first or second value, where the plurality of insert control values correspond to one or more predetermined words in a corresponding plurality of basic frames for each radio data frame. In selected embodiments, the hardware control mechanism includes a plurality of multiplexer output selection circuits, each of which is connected to receive a first input from the auxiliary memory and a second input from the local system memory, and which receives a control signal from a mask register that is controlled by a control word mask update module which scans a bit in an update bitmap corresponding to a first control word for a current basic frame and sets all bits in the mask register for the first control word to a predetermined value, thereby controlling the plurality of multiplexer output selection circuits to insert one or more control words from the local system memory.

Although the described exemplary embodiments disclosed herein are directed to methods and systems for automatically controlling the insertion of control word in CPRI daisy chain configuration, the present invention is not necessarily limited to the example embodiments illustrate herein, and various embodiments of the circuitry and methods for automatically controlling the insertion of information flow data disclosed herein may be implemented with other devices and circuit components. Thus, the particular embodiments disclosed above are illustrative only and should not be taken as limitations upon the present invention, as the invention may be modified and practiced in different but equivalent manners apparent to those skilled the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for operating a local base station subsystem connected between first and second base station subsystems over first and second common interface links in a daisy chain configuration, comprising:
   programming one or more mask update registers to store an update bitmap with a plurality of control word insert values having either a first or second value, where the plurality of control word insert values correspond to a plurality of basic frame control words in a corresponding plurality of basic frames and where each bit in the update bitmap is a control word insert value that uniquely maps to one of the basic frames; and
   switching into a radio data frame for transmission to the second base station subsystem one or more basic frame control words from system memory of the local base station subsystem for each control word insert value from the update bitmap having the first value by inserting at least a first basic frame control word into a first basic frame corresponding to a first control word insert value having the first value.

2. The method of claim 1, where programming one or more mask update registers occurs during configuration of the first and second common interface links.

3. The method of claim 1, where the first and second common interface links respectively comprise first and second Common Public Radio Interface (CPRI) serial interface links.

4. The method of claim 1, where programming one or more mask update registers comprises programming 8×32-bit mask update registers to store the update bitmap with 256 control word insert values, where each of the 256 control word insert values correspond uniquely to a control word in one of the plurality of basic frames.

5. The method of claim 1, further comprising:
   receiving an upstream radio data frame from the first base station subsystem over the first common interface link after programming one or more mask update registers; and
   selecting IQ samples and control data from the upstream radio data frame for storage in system memory of the local base station subsystem before switching into the radio data frame one or more inserted basic frame control words.

6. The method of claim 1, further comprising switching into the radio data frame forwarded data from the first base station subsystem for each control word insert value from the update bitmap having the second value.

7. The method of claim 1, further comprising, for each control word insert value from the update bitmap having the second value, switching forwarded data from the first base station subsystem into the radio data frame.

8. The method of claim 1, further comprising configuring the local base station subsystem as a radio equipment control device connected between a first base station subsystem configured as a radio equipment control device and second base station subsystem configured as a radio equipment device.

9. The method of claim 1, further comprising configuring the local base station subsystem as a radio equipment device connected between a first base station subsystem configured as a radio equipment control device and second base station subsystem configured as a radio equipment device.

10. The method of claim 1, further comprising configuring the local base station subsystem as a radio equipment device connected between a first base station subsystem configured as a radio equipment device and second base station subsystem configured as a radio equipment device.

11. The method of claim 1, further comprising configuring the local base station subsystem as a radio equipment control device connected between a first base station subsystem configured as a radio equipment control device and second base station subsystem configured as a radio equipment control device.

12. An integrated circuit for a local base station subsystem connected between first and second base station subsystems over first and second common interface links in a daisy chain configuration, the integrated circuit comprising:

an auxiliary memory for storing radio data frames from the first base station subsystem;

a local system memory for storing one or more basic frame control words for insertion in a radio data frame;

one or more mask update registers for storing an update bitmap with a plurality of control word insert values having either a first or second value, where the plurality of control word insert values correspond to a plurality of basic frame control words in a corresponding plurality of basic frames for each radio data frame and where each bit in the update bitmap is a control word insert value that uniquely maps to one of the basic frames; and a serial data interface for transmitting radio data frames to the second base station subsystem by switching into the radio data frame one or more basic frame control words from local system memory of the local base station subsystem for each control word insert value from the update bitmap having the first value by inserting at least a first basic frame control word into a first basic frame corresponding to a first control word insert value having the first value.

13. The integrated circuit of claim 12, where the first and second common interface links respectively comprise first and second Common Public Radio Interface (CPRI) serial interface links.

14. The integrated circuit of claim 12, where the one or more mask update registers comprises 8 32-bit mask update registers for storing the update bitmap with 256 control word insert values, where each of the 256 control word insert values correspond uniquely to a control word in one of the plurality of basic frames.

15. The integrated circuit of claim 12, where the serial data interface comprises a plurality of multiplexer output selection circuits, each of which is connected to receive a first input from the auxiliary memory and a second input from the local system memory, and which receives a control signal from a mask register that is controlled by a corresponding mask update register.

16. The integrated circuit of claim 15, further comprising a control word mask update module which scans a bit in the update bitmap corresponding to the first basic frame control word for a current basic frame and sets all bits in the mask register for the first basic frame control word to a predetermined value, thereby controlling the plurality of multiplexer output selection circuits to insert one or more basic frame control words from the local system memory.

17. The integrated circuit of claim 12, further comprising a local processor for programming the one or more mask update registers during configuration of the first and second common interface links.

18. The integrated circuit of claim 12, where the local base station subsystem is configured as a radio equipment control device or radio equipment device connected between a first base station subsystem and second base station subsystem.

19. An integrated circuit for a local base station subsystem connected between first and second base station subsystems over first and second common interface links in a daisy chain configuration, the integrated circuit comprising:

a Common Public Radio Interface (CPRI) link for transmitting radio data frames to the second base station subsystem;

a CPRI transmit serial interface for automatically controlling insertion of information flow data in the transmitted radio data frames;

an auxiliary memory for storing radio data frames from the first base station subsystem;

a local system memory for storing one or more basic frame control words for insertion in a transmitted radio data frame; and a hardware control mechanism for determining whether each basic frame bit being transmitted in a transmitted radio data frame is sourced from the auxiliary memory or from the local system memory using one or more mask update registers for storing an update bitmap with a plurality of control word insert values having either a first or second value, where the plurality of control word insert values correspond to a plurality of basic frame control words in a corresponding plurality of basic frames for each radio data frame and where each bit in the update bitmap is a control word insert value that uniquely maps to one of the basic frames.

20. The integrated circuit of claim 19, where the hardware control mechanism comprises a plurality of multiplexer output selection circuits, each of which is connected to receive a first input from the auxiliary memory and a second input from the local system memory, and which receives a control signal from a mask register that is controlled by a control word mask update module which scans a bit in an update bitmap corresponding to a first basic frame control word for a current basic frame and sets all bits in the mask register for the first basic frame control word to a predetermined value, thereby controlling the plurality of multiplexer output selection circuits to insert one or more basic frame control words from the local system memory.

* * * * *